(12) United States Patent
Sharma et al.

(10) Patent No.: US 12,069,039 B2
(45) Date of Patent: Aug. 20, 2024

(54) DYNAMICALLY UNIFYING DISPARATE USER INTERFACE APPLICATIONS IN A CLOUD NATIVE ENVIRONMENT

(71) Applicant: EMC IP Holding Company LLC, Hopkinton, MA (US)

(72) Inventors: Anurag Sharma, Cedar Park, TX (US); Jo Ann Varble, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 177 days.

(21) Appl. No.: 17/078,546

(22) Filed: Oct. 23, 2020

(65) Prior Publication Data
US 2022/0131852 A1    Apr. 28, 2022

(51) Int. Cl.
  *H04L 9/40*    (2022.01)
  *G06F 9/451*    (2018.01)

(52) U.S. Cl.
  CPC .......... *H04L 63/0815* (2013.01); *G06F 9/451* (2018.02)

(58) Field of Classification Search
  CPC .............................. H04L 63/0815; G06F 9/451
  See application file for complete search history.

(56) References Cited

U.S. PATENT DOCUMENTS

| | | | | |
|---|---|---|---|---|
| 8,955,080 B2* | 2/2015 | Brunswig | ........... | H04L 63/0815 726/8 |
| 9,462,068 B2* | 10/2016 | Pieczul | ................... | G06F 11/36 |
| 9,769,238 B2 | 9/2017 | Ludin et al. | | |
| 9,967,311 B2* | 5/2018 | De La Chevrotiere | ...................... | H04L 67/02 |
| 10,129,344 B2* | 11/2018 | Pogrebinsky | ........... | H04L 67/10 |
| 10,250,667 B2 | 4/2019 | Ludin et al. | | |

(Continued)

OTHER PUBLICATIONS

Abbas, Ameer, "Ingress with NGINX controller on Google Kubernetes Engine," Feb. 12, 2018, Available https://cloud.google.com/community/tutorials/nginx-ingress-gke (Year: 2018).*

(Continued)

*Primary Examiner* — Alvin H Tan
(74) *Attorney, Agent, or Firm* — Ryan, Mason & Lewis, LLP

(57) ABSTRACT

Methods, apparatus, and processor-readable storage media for dynamically unifying disparate UI applications in a cloud native environment are provided herein. An example computer-implemented method includes obtaining information pertaining to a container-orchestration system operating within at least one cloud native environment; configuring, based on the obtained information, a single sign-on authentication mechanism for multiple user interface applications in the container-orchestration system; configuring, based on the obtained information, at least one ingress route for two or more of the multiple user interface applications in the container-orchestration system; configuring and rendering, based on information pertaining to the at least one ingress route, a common header in at least each of the two or more user interface applications; and performing one or more automated actions based on the configured single sign-on authentication mechanism, the at least one configured ingress route, and the configured and rendered common header.

20 Claims, 16 Drawing Sheets

(56) References Cited

U.S. PATENT DOCUMENTS

2012/0005738 A1* 1/2012 Manini ............... H04L 63/0815
                                                    726/7
2019/0230143 A1   7/2019 Ludin et al.
2022/0038449 A1*  2/2022 Tripp ...................... H04L 67/02

OTHER PUBLICATIONS

Sarathy, Viji, "Load balancing Amazon ECS services with a Kubernetes Ingress Controller style approach," Aug. 19, 2020, Available https://aws.amazon.com/blogs/containers/load-balancing-amazon-ecs-services-with-a-kubernetes-ingress-controller-style-approach/ (Year: 2020).*

De Alwis, Chamila, "Load Balancing and Reverse Proxying for Kubernetes Services," Feb. 28, 2019, Available https://medium.com/@chamilad/load-balancing-and-reverse-proxying-for-kubenetes-services-f03dd0efe80 (Year: 2019).*

Sebastian, "Nginx Reverse Proxy with TLS Encryption," Jun. 1, 2020, Available https://web.archive.org/web/20200715162225/https://dev.to/admantium/nginx-reverse-proxy-with-tts-encryption-3d54 (Year: 2020).*

* cited by examiner

```
{
  "refs":
  [
    {
      "category": "Data Protection",
      "title": "Data Manager",
      "description": "Click here to navigate to Data Manager",
      "link": "/ppdm",
      "icon": "https://icons.example.com/ppdm.png"
    },
    {
      "category": "Data Protection",
      "title": "Data Domain",
      "description": "Click here to navigate to Data Domain",
      "link": "/dd",
      "icon": "https://icons.example.com/dd.png"
    },
    {
      "category": "Block Storage",
      "title": "SDS",
      "description": "Click here to navigate to SDS",
      "link": "/sds",
      "icon": "https://icons.example.com/sds.png"
    },
    ...
  ]
}
```

```
$(document).ready(function (e) {
    $.ajax({
        url: '/links',
        method: 'get',
        success: function(jsonData) {
            $('#common-nav-header').html('');
            // Transform jsonData into an HTML snippet representing
            // common navigation header
            $.getJSON(jsonData, function (json) {
                var li = '';
                $.each(json.refs, function (index, response) {
                    var cls = (index == 0 ? "active" : "");
                    li += "<ul class=\"nav navbar-nav\" ><li class=\"" + cls +
                    "\"><a > " + $(this)[0].category + "</a></li></ul>";
                });
                $('#common-nav-header').html(li);
            })
        }
    })
});
```

FIG. 5

```
apiVersion: apiextensions.k8s.io/v1
kind: CustomResourceDefinition
metadata:
  # name must match the spec fields below and be in the form: <plural>.<group>
  name: unifiedapps.stable.example.com
spec:
  # group name to use for REST API: /apis/<group>/<version>
  group: stable.example.com
  # list of versions supported by this CustomResourceDefinition
  versions:
    - name: v1
      # Each version can be enabled/disabled by Served flag.
      served: true
      # One and only one version must be marked as the storage version.
      storage: true
      schema:
        openAPIV3Schema:
          type: object
          properties:
            spec:
              type: object
              properties:
                ssoClientID:
                  type: string
                ssoRedirectURI:
                  type: string
                linkCategory:
                  type: string
                linkTitle:
                  type: string
                linkDescription:
                  type: string
                linkIcon:
                  type: string
                linkURL:
                  type: string
                serviceName:
                  type: string
                servicePort:
                  type: integer
  # either Namespaced or Cluster
  scope: Namespaced
  names:
    # plural name to be used in the URL: /apis/<group>/<version>/<plural>
    plural: unifiedapps
    # singular name to be used as an alias on the CLI and for display
    singular: unifiedapp
    # kind is normally the CamelCased singular type. Your resource manifests use this.
    kind: UnifiedApp
    # shortNames allow shorter string to match your resource on the CLI
    shortNames:
      - ua
```

FIG. 6

```
apiVersion: "stable.example.com/v1"
kind: UnifiedApp
metadata:
  name: datamanager-unifiedapp
spec:
  ssoClientID: "datamanager"
  ssoRedirectURI: "/ppdm/oidc"
  linkCategory: "Data Protection"
  linkTitle: "Data Manager"
  linkDescription: "Click here to navigate to Data Manager"
  linkIcon: "https://icons.example.com/ppdm.png"
  linkURL: "/ppdm"
  serviceName: "ppdm"
  servicePort: 8080
```

FIG. 7

```
apiVersion: v1
kind: Pod
metadata:
  name: datamanager-webapp
spec:
  containers:
  - name: datamanager-container
    image: datamanager
    env:
      - name: SSO_CLIENT_ID
        value: datamanager
      - name: SSO_CLIENT_SECRET
        valueFrom:
          secretKeyRef:
            name: datamanager
            key: ssoClientSecret
      - name: SSO_WELL_KNOWN_URL
        valueFrom:
          secretKeyRef:
            name: datamanager
            key: ssoWellKnownURL
```

800

US 12,069,039 B2

DYNAMICALLY UNIFYING DISPARATE USER INTERFACE APPLICATIONS IN A CLOUD NATIVE ENVIRONMENT

FIELD

The field relates generally to information processing systems, and more particularly to user interface (UI) technologies in such systems.

BACKGROUND

Information technology solutions (e.g., server solutions, networking solutions, storage, data protection solutions, etc.) commonly come with their own management software to implement tasks such as deployment, configuration, monitoring, etc., and such software typically requires the use of separate UIs and sign-in methods. Additionally, UI applications (apps) owned by separate entities and/or developed using different UI technologies commonly create problems with respect to integration and user experience. For example, conventional UI management approaches that attempt to utilize a common UI framework for multiple UI applications encounter problems due at least in part to frequent changes in UI-related technologies.

SUMMARY

Illustrative embodiments of the disclosure provide techniques for dynamically unifying disparate UI applications in a cloud native environment. An exemplary computer-implemented method includes obtaining information pertaining to a container-orchestration system operating within at least one cloud native environment, and configuring, based at least in part on the obtained information, a single sign-on authentication mechanism for multiple user interface applications in the container-orchestration system. The method also includes configuring, based at least in part on the obtained information, at least one ingress route for two or more of the multiple user interface applications in the container-orchestration system, and configuring and rendering, based at least in part on information pertaining to the at least one ingress route, a common header in at least each of the two or more user interface applications. Further, the method includes performing one or more automated actions based at least in part on the configured single sign-on authentication mechanism, the at least one configured ingress route, and the configured and rendered common header.

Illustrative embodiments can provide significant advantages relative to conventional UI management approaches. For example, problems associated with UI application integration and user experience are overcome in one or more embodiments through configuring a single sign-on authentication mechanism, ingress routes, and a common header to unify multiple UI applications within a container-orchestration system.

These and other illustrative embodiments described herein include, without limitation, methods, apparatus, systems, and computer program products comprising processor-readable storage media.

BRIEF DESCRIPTION OF THE DRAWINGS

FIG. 4 shows example data related to a JSON response of link service in an illustrative embodiment.

FIG. 5 shows an example code snippet for a common header JS in an illustrative embodiment.

FIG. 6 shows an example code snippet for a custom resource definition (CRD) for a unified application in an illustrative embodiment.

FIG. 7 shows an example code snippet for a custom resource object definition in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
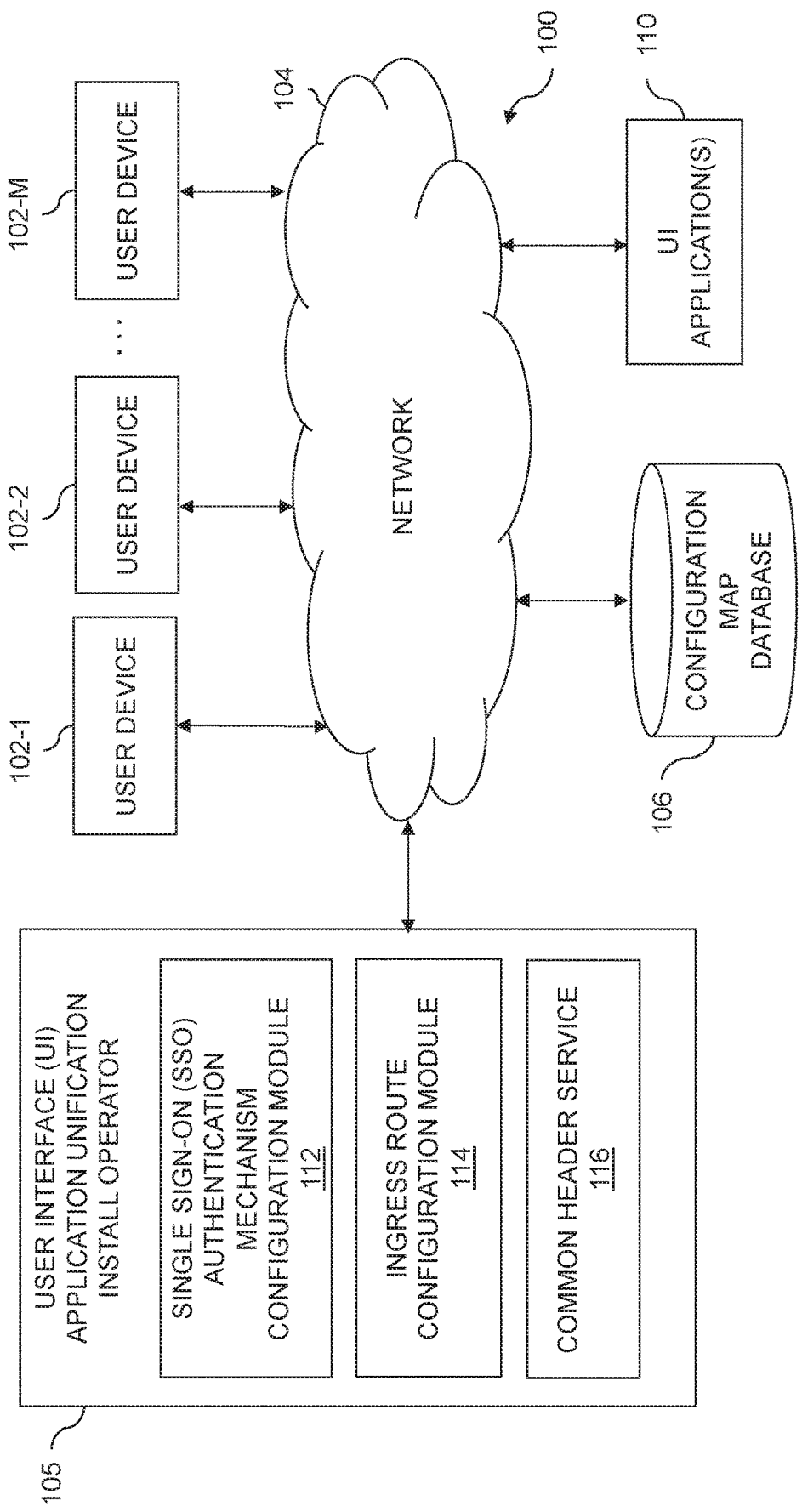
FIG. 1 shows an information processing system configured for dynamically unifying disparate UI applications in a cloud native environment in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is UI application unification install operator 105 (also referred to herein merely as "install operator") and one or more UI applications 110.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, UI application unification install operator 105 can have an associated database 106 configured to store data pertaining to configuration map information, which comprise, for example, container-orchestration system information, UI application information, etc.

The database 106 in the present embodiment is implemented using one or more storage systems associated with UI application unification install operator 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with UI application unification install operator 105 can be one or more input-output devices, which illustratively comprise keyboards, displays or other types of input-output devices in any combination. Such input-output devices can be used, for example, to support one or more UIs to UI application unification install operator 105, as well as to support communication between UI application unification install operator 105 and other related systems and devices not explicitly shown.

Additionally, UI application unification install operator 105 in the FIG. 1 embodiment is assumed to be implemented using at least one processing device. Each such processing device generally comprises at least one processor and an associated memory, and implements one or more functional modules for controlling certain features of UI application unification install operator 105.

More particularly, UI application unification install operator 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows UI application unification install operator 105 to communicate over the network 104 with the user devices 102, and illustratively comprises one or more conventional transceivers.

The UI application unification install operator 105 further comprises single sign-on (SSO) authentication mechanism configuration module 112, ingress route configuration module 114, and common header service 116.

It is to be appreciated that this particular arrangement of modules 112, 114 and 116 illustrated in the UI application unification install operator 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for dynamically unifying disparate UI applications in a cloud native environment involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of UI application unification install operator 105, configuration map database 106, and UI application(s) 110 can be on and/or part of the same processing platform.

An exemplary process utilizing modules 112, 114 and 116 of an example UI application unification install operator 105 in computer network 100 will be described in more detail with reference to the flow diagram of FIG. 14.

Accordingly, at least one embodiment includes dynamically unifying disparate UI applications in a cloud native environment. As further detailed herein, such an embodiment can include generating a PaaS for running container-based applications wherein various management software enabled to run on the platform can be installed and delivered in the form of at least one container-orchestration system application (e.g., Kubernetes is used herein as an example container-orchestration system, but it is to be appreciated that one or more additional container-orchestration systems can be used in other embodiments). Additionally, one or more embodiments include automating the configuration of an SSO authentication mechanism, implementing one or more ingress routes, and injecting at least one common UI navigation header to provide a unified product experience to the user.

Accordingly, when UI applications are deployed in a managed uniform platform (as further detailed herein), at least one embodiment (e.g., via a Kubernetes deployment model) automatically makes the UI applications available, and a unified view accessible via a single uniform resource locator (URL) enabled with SSO is generated and/or provided to at least one user.

As such, one or more example embodiments can include the use of a Kubernetes-based PaaS, which a customer can acquire from a vendor in an appliance form factor, consume directly from a cloud provider, or deploy on-premise or in the cloud. Kubernetes, as described herein, is a container orchestration engine which can be leveraged for building a PaaS to allow the running of cloud native applications. As also further described below, in such a context, an application can be packaged, delivered, deployed and managed in an automated fashion.

Web applications and/or microservices (e.g., a representational state transfer (REST) application programming interface (API)) are packaged in the form of containers using build tools (e.g., Docker) to produce an Open Container Initiative (OCI) format image (e.g., a Docker container image). The container images can be published to an OCI-compatible container registry, which can be accessed by Kubernetes via, for example, a LAN or the Internet. In order to run a web application or microservice in Kubernetes, the web application or microservice must include one or more of following manifest files.

A pod manifest (.yaml) includes a reference to the container image among other information such as information pertaining to central processing unit (CPU), memory, storage requirements, etc. One pod may include more than one container, such as, for example, a sidecar container used for initializing the application or intercepting traffic for mutual TLS (mTLS) authentication.

A service manifest (.yaml) defines Kubernetes service type and transmission control protocol (TCP) ports for incoming traffic. The service acts as an internal load balancer to route traffic across a set of pods for an application. For example, if an application is scaled-out during a peak load, the Kubernetes may spawn multiple replicas of the application pod. The service will distribute the incoming requests to all pods evenly to maintain the load, and the pods are ephemeral, while the services are permanent.

An ingress manifest (.yaml) defines an ingress route. For example, to map a hypertext transfer protocol (HTTP) URL path "/service1" to a domain name so that the HTTP URL gets routed from the URL to service1.cluster.local running at a port (e.g., 8080) can include using a reverse proxy, which is a function of an ingress controller and/or web server.

Other manifest files (.yaml), for example, configMap or secret store, which are part of a Kubernetes database for storing key-value pairs and applications, can leverage such a file to define environment-specific configurations and/or credentials.

In order to deploy a web application or microservice in Kubernetes, a developer can use, for example, a Kubernetes command line input (CLI) referred to as kubectl to apply individual .yaml files or package all .yaml files in a Helm Chart and use Helm CLI to deploy a complete chart. The Helm chart follows a hierarchical directory structure to allow packaging an entire application, which may include multiple services such as database, SSO, API, web application, etc. The charts can be published to a web server and made accessible to Helm CLI via a LAN and/or the Internet.

The request from kubectl or Helm CLI are received by a Kubernetes API server, and the Kubernetes scheduler finds the appropriate node based on availability and/or specific resource requirements such as CPU, memory, storage, or node label, as specified in the pod manifest to run the pod.

By way of example, each node in Kubernetes includes kubelet, kube-proxy and container runtime. The nodes are grouped into master nodes and worker nodes. The master nodes run Kubernetes control plane components, which include an API server, a scheduler, a control manager and a database referred to as a cluster store for storing configMap, secrets and states of other Kubernetes runtime objects. An odd number of master nodes (3, 5, 7, etc.) form a highly available (HA) cluster based on a consensus algorithm for choosing the active leader. Any number of worker nodes can be joined to the cluster as part of the cluster setup and are used for running applications in the form of pods. A typical Kubernetes cluster can include one or more of the following add-on services from third party and/or open source software (OSS): an overlay network based on a container network interface (CNI) implementation, an internal domain name system (DNS) service, and a storage driver based on a container storage interface (CSI) implementation for providing persistent volumes to pods. Additionally, in one or more embodiments, not all pods need persistent volumes, but services (e.g., such as a database) need persistent storage.

Also, the scheduled pods can run under a private network and can identify each other using an internal DNS name of the service for the purpose of making API calls. By default, no traffic can flow in and out of this private network. In order to make services accessible from outside of the network, the Kubernetes-based PaaS may include additional services such as, for example, an ingress controller, a certificate manager, and a load balancer.

An ingress controller acts as a front-end web server for reverse proxying the traffic from outside of the private network to the private network. By way of example, an application developer can define a routing rule in the ingress manifest file in order to expose a service to outside of the network. Additionally, an ingress controller can include a web server and a controller code, for example, written to intercept Kubernetes object lifecycle events (e.g., create, update, delete, etc.), and more specifically the ingress object so that the ingress controller can automatically reconfigure the web server without causing interruption to define a virtual server to proxy the traffic for the given domain to an assigned backend service.

Accordingly, an ingress controller can monitor the lifecycle events of an ingress object, and automatically define reverse proxy rules for the domain along with a transport layer security (TLS) certificate. By way of example, a reverse proxy definition with TLS in a web server is also known as a TLS termination endpoint; i.e., the encrypted traffic is terminated at the web server which takes care of encrypting and/or decrypting the HTTP request/response coming from a web browser, and proxied services do not need to participate in the encryption and/or decryption.

With respect to a certificate manager (cert-manager), an ingress manifest file can include a cert-manager annotation to indicate that the domain name defined for the route needs a secure sockets layer (SSL) certificate and/or a TLS certificate for encrypting traffic. The certificate manager intercepts Kubernetes object lifecycle events (e.g., create, update, delete, etc.), and more specifically the ingress object. Also, the certificate manager automatically generates a certificate and programmatically gets the certificate signed by the configured issuer (e.g., self-signed or signed by a trusted issuer) for the given domain name. The certificate manager can also automatically renew the certificate upon expiration.

With respect to a load balancer, by default, an ingress service can be accessed through a node IP address. The load balancer can provide a virtual IP (VIP) attached to one of the nodes, and in case of failure of the node, the load balancer can automatically move the VIP to another node. In addition to VIP failover, the load balancer, when configured in border gateway protocol (BGP) mode, can rotate traffic across multiple nodes to evenly distribute the traffic. Additionally, a PaaS administrator can define the mapping between a load balancer-provided VIP and a domain name defined in the ingress manifest in the zone file of the DNS server managed by the administrator.

By way merely of example, when a user hits and/or selects a given URL, the browser resolves the domain name to the given VIP. The VIP points to one of the Kubernetes nodes or to a switch (in the case of BGP mode), which takes care of rotating traffic across Kubernetes nodes. When traffic hits a node, the Kube-Proxy routes the traffic to the correct service and/or pod using operating system-level (OS-level) and pod-level networking constructs.

At least one embodiment also includes utilization of a unified management plane. By way of illustration, consider an example data center environment wherein a customer purchased multiple solutions from the same vendor for primary and secondary storage. In a conventional example scenario, each solution delivered in the form of an appliance or a virtual machine (VM) has at least one web application to allow the customer to interact with the solution, and each solution has its own authentication mechanism and the customer must navigate to several web applications with different credentials or, even if there is integration with the customer's active directory server, the customer still has to login multiple times. Such conventional approaches, as noted herein, do not include a single sign-on across these solutions for the web interface, and each solution is typically developed by different engineering teams at the vendor organization, with each team commonly utilizing a different UI framework to develop their web application(s).

In addition to an appliance-based consumption model of each solution, another consumption model includes the use of a management plane of each solution which can run in a shared Kubernetes-based PaaS. Such a use case can be useful, for example, when the management plane of each solution requires additional servers, storage and/or networking infrastructure.

A unified management plane can be, for example, acquired by a customer as part of one solution from a vendor. In such a scenario, the customer can drop management applications, for example, from data protection and/or data domain components, into the same unified management plane running a management application of a given solution.

Accordingly, as detailed herein in accordance with one or more embodiments, a management application can be generated for an appliance form factor and be able to run in the unified management plane without reimplementing functionality to minimize the cost of development. A Kubernetes-based PaaS enables developers to repackage the same application in the cloud native format (e.g., containers and Helm chart) without changing actual implementation. The cloud native package can be deployed to Kubernetes and the original package can be deployed to the appliance. In such an embodiment, the customer may expect all applications running in the unified management plane to look like one integrated product, which can require a vendor to provide a unified UI comprised of disparate web applications. As detailed herein, one or more embodiments include applying multiple levels of unification to achieve such a unified experience.

For example, in such an embodiment, each web application must adhere to given user experience (UX) design guidelines and specifications to produce a consistent layout and navigation experience. Additionally, the user/customer should be required to authenticate only once (e.g., via an SSO authentication mechanism) and must be able to navigate across different web applications without being prompted for additional logins. Further, as also detailed herein, such an embodiment includes a unified endpoint, whereby the user/customer should not be required to remember the URL of each web application but should see the navigation links of different web applications in one unified web application accessed from a single URL.

As such, at least one embodiment includes generating and providing a unified web application with installation automation to make other web applications appear in a common navigation header of the unified web application as hyperlinks when such other web applications are deployed to the unified management plane. The installation automation also automates the configuration required in each management application to enable SSO. Such automation is useful, for example, when delivery of each management application itself is fully automated in a way that the user/customer can browse an online catalog to click and add another application to the unified management plane. In such an embodiment, a management application can be assumed to include at least one web application and optionally include a set of one or more backend microservices (e.g., REST API(s)).

As such, by way merely of example, at least one embodiment can include adding a specific route to a given web server (e.g., an ingress in a Kubernetes environment) to allow web traffic to reach to the corresponding UI application. In at least one example use case, the UI application may need to be registered into an identity provider (IDP) system, and the IDP will issue a client identifier (ID) and/or a secret for SSO integration. Such a registration can require, for example, the UI application's domain URL for an authentication protocol (e.g., an OpenID Connect (OIDC) protocol), which is typically available only after web server configuration. Accordingly, in such a scenario, the UI application may need to know the client ID and/or secret issued by the IDP in order to participate in the authentication and/or authorization workflow(s).

As further detailed herein, at least one embodiment includes assuming that UI applications are delivered in the form of containers and adding at least one application manifest based on a CRD to represent at least one Kubernetes object (e.g., at least one pod object, at least one deployment object, at least one replica set object, etc.). Such an embodiment additionally includes facilitating the creation of a new kind of CRD for UI applications which includes metadata to describe the intent of creating entries in an IDP system and adding one or more routes in a web server. Such metadata can include, for example, information required to register the UI application as a client in an IDP system with a specific client ID. Such metadata, in one or more embodiments, can also include information pertaining to adding at least one route into the given web server to allow web traffic to reach to the UI application using a sub-domain and/or URL suffix.

In at least one embodiment, when Kubernetes attempts to deploy a UI application, Kubernetes notifies the CRD controller available in the managed unified platform, which in turn completes one or more pre-requisites for the UI application. Such pre-requisites can include, for example, registering the application with IDP and adding the returned client ID and/or secret into at least one Kubernetes configuration map (configMap) to share with the UI application. Additionally, such pre-requisites can also include, for example, adding at least one route into the web server and augmenting metadata of the added route(s) maintained in at least one separate Kubernetes configMap.

As detailed herein, one or more embodiments additionally include enabling navigation across different UI applications. Using conventional approaches, even if web server and SSO server configurations are resolved, the user may not know the URL, domain prefix, and/or URL suffix of each application. However, as further described herein, at least one embodiment includes generating and/or implementing a navigation header common across each UI application to enable a user to navigate across different applications.

In such an embodiment, the managed unified platform includes a service referred to herein as a common-header service, which reads route metadata from the Kubernetes configMap and returns a navigation map at the page load time to a custom JavaScript included into each UI application. The JavaScript replaces a hypertext markup language (HTML) placeholder in the UI application with a decorated common navigation header including links to all of the registered UI applications in the platform. As a result, the user is provided with a unified UX such as further detailed herein.

One or more embodiments also include unifying UI applications. By having a common navigation header, such an embodiment includes achieving a link and launch experience combined with SSO and a unified domain, which is a first level of unification. An additional level of unification includes providing a consistent look and feel of the UI applications, which can be achieved by implementing predetermined UX design guidelines across all UI applications on the platform. Yet another level of unification includes a single-page application (SPA) experience for an integrated view, which provides in-page navigation across all relative and absolute URLs.

Such an embodiment includes using an SPA framework, wherein each UI application is assumed to be an SPA and the SPA framework (written, e.g., in JavaScript) combines disparate UI applications developed using one or more UI technologies into one unified single-page application without merging individual projects. The unification is achieved by developing a new SPA as a front-end UI application and then, by exploiting one or more JavaScript techniques, building navigations of routes across different applications. Such techniques can include, for example, mounting and/or unmounting an SPA (e.g., a registered app) for a particular URI and/or link in the primary document object model (DOM) (e.g., front-end UI). As used in this context, DOM is an in-memory representation of the web page and JS is the programming interface for dynamically manipulating DOM to update the web page.

Also, in connection with one or more embodiments detailed herein, at least a portion of such embodiments are described in the context of a managed unified platform, but it is to be appreciated that such embodiments and additional embodiments can be extended to any Kubernetes PaaS or non-Kubernetes environment.

As described herein, one or more embodiments include automated configuration of an SSO protocol, one or more ingress routes, and a common header. In such an embodiment, a unified delivery mechanism can be based at least in part, for example, on Docker containers. Additionally, such an embodiment can include pushing containers and pod manifests into a Docker repository, as well as carrying out automated installations and/or upgrades.

As also detailed herein, at least one install operator is implemented to monitor a Docker repository and automate one or more configurations based at least in part on one or more pod manifests. With respect to configuring an SSO protocol, such an embodiment can include creating a client application in an SSO authentication mechanism (e.g., Keycloak) and adding a generated client ID and/or client secret to a Kubernetes configMap for at least one UI application and/or web application to consume. With respect to configuring a common header, such an embodiment can include adding a link and launch header to at least one Kubernetes configMap. A common header generation REST service will return at least one JSON map of common header names with at least one target URL, each UI application will have an HTML placeholder for the common header, and a web development technique (e.g., Ajax) will get above the JSON map and update the placeholder.

Further, at least one embodiment includes deploying a UI application pod and exposing the same as a Kubernetes service. Also, one or more embodiments include generating and/or implementing an ingress controller, which configures a route for the exposed Kubernetes service for the UI application. Such an embodiment can also include performing automatic secure sockets layer (SSL) termination as well as generating and/or implemented at least one sub-domain or path-based route.

Figure 2:
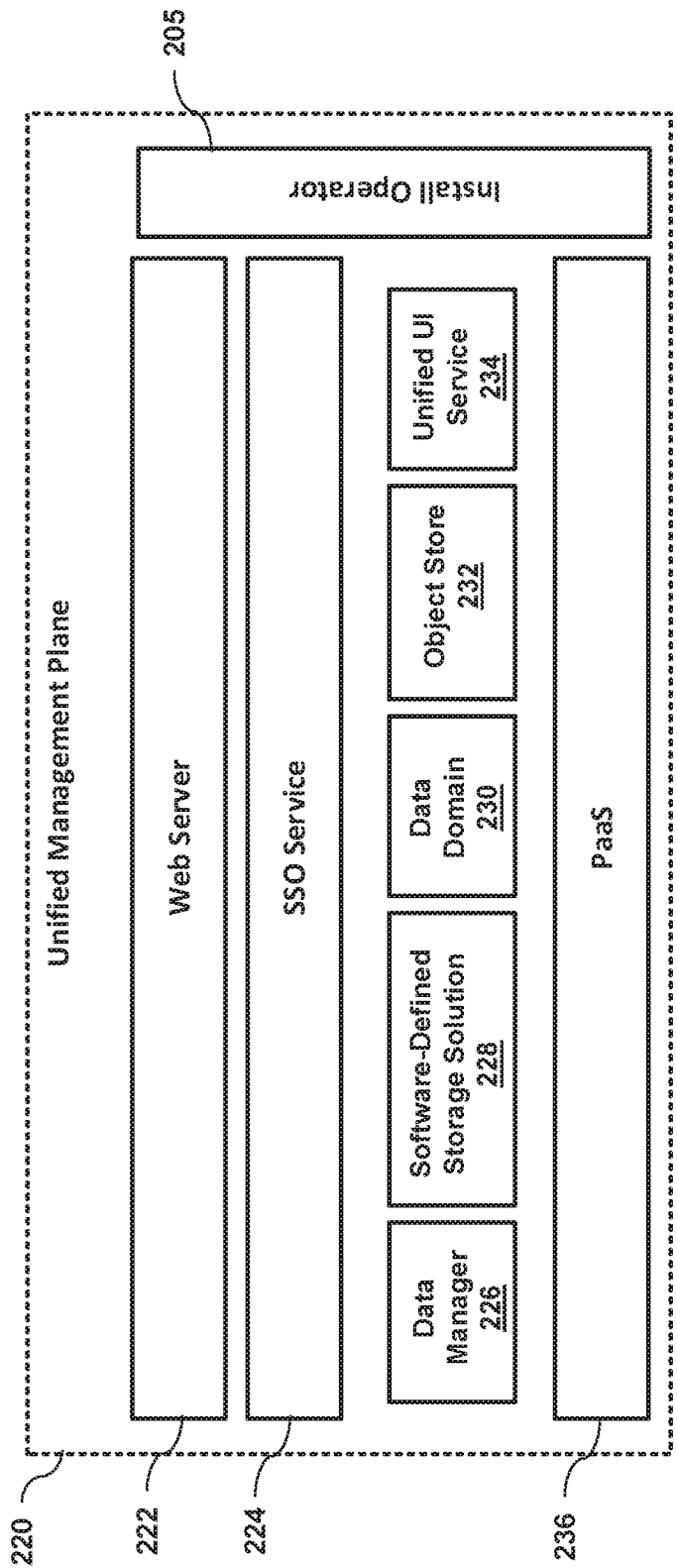
FIG. 2 shows a unified management plane in an illustrative embodiment.

FIG. 2 shows a unified management plane in an illustrative embodiment. By way of illustration, FIG. 2 depicts a unified management plane 220 which includes web server 222, SSO service 224, install operator 205, data manager 226, software-defined storage solution 228, data domain 230, object store 232, unified UI service 234, and PaaS 236. Such an example embodiment can include using management applications that support a standard-based SSO (such as, for example, OIDC) so that an identity provider can be different in the unified management plane from its appliance form factor, but the protocol would be the same.

As noted herein, many UI frameworks allow building an SPA wherein a user starts with one URL (page) and, as the user navigates across different links within the page, the content is asynchronously fetched from the web server and augmented into the same page without causing the whole page to reload. In a traditional web application, each link click would require fetching a full page synchronously from the web server, wherein each page is crafted at the backend to include the changed and unchanged portions of the page. As such, a traditional web application is generally slower compared to an SPA because an SPA only fetches a portion of the page content on a link click and retains the unchanged portions of the page. One or more embodiments includes utilizing SPA for each web application to provide an improved UX.

Referring again to FIG. 2, at least one embodiment includes adding multiple components to act in conjunction with PaaS 236. For example, unified UI service 234 hosts components such as a landing page as a lightweight traditional web application to hold the common navigation header (and which may also serve as a splash screen or dashboard), a link microservice (e.g., a REST API) to return a map (as detailed in connection with FIG. 3) of a URL and one or more registered web applications, and a common JS (e.g., unified-ui-common-header.js) to detect the presence of a unified management plane and to call a link microservice to fetch the navigation links of registered web applications. As also illustrated in FIG. 2, install operator 205 intercepts the PaaS-specific deployment workflow and injects a required configuration for SSO and a unified web application.

Figure 3:
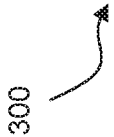
FIG. 3 shows an example code snippet for a hypertext markup language (HTML) page containing common JS and a placeholder in an illustrative embodiment.

FIG. 3 shows an example code snippet for an HTML page containing common JS and a placeholder in an illustrative embodiment. In this embodiment, example code snippet 300 is executed by a web browser. For example, the example code snippet 300 may be viewed as comprising a portion of a software implementation of at least part of UI application 110 of the FIG. 1 embodiment.

The example code snippet 300 illustrates implementing changes to a web application header page for making the web application header page compatible with a unified management plane without impacting its behavior in the appliance form factor. Such changes include adding an empty and/or invisible HTML fragment with ID as a placeholder in the page header, and including the common JS developed for the unified management plane. In the appliance form factor of a web application, this common JS will fail to connect to the link microservice and, hence, the placeholder will remain empty and/or invisible. In one or more embodiments, the same HTML change is also included in the landing page of the unified UI service.

It is to be appreciated that this particular example code snippet shows just one example implementation of changing a web application header page, and alternative implementations of the process can be used in other embodiments.

As also detailed herein, at least one embodiment includes implementing a unified UI service 234. In such an embodiment, the unified UI service is packaged as a cloud native application (e.g., container and manifest files) and deployed to the PaaS. The unified UI service also includes an ingress manifest to define the route in the ingress controller for making its JS, a REST API, and a landing page accessible to at least one outside network. The landing page (e.g., component 944 in FIG. 9) can be as simple as the HTML snippet shown in FIG. 3 and made available via an ingress definition to become the default page of the primary domain. The link microservice (e.g., REST API; also illustrated, e.g., by component 948 in FIG. 9) can be implemented in any server-side programming language and exposed to at least one outside network via an ingress definition to make the link microservice available via URL.

FIG. 4 shows example data related to a JSON response of link service in an illustrative embodiment. In this embodiment, example data 400 can be processed by code snippet 500 as illustrated in connection with FIG. 5.

The example data 400 illustrate a JSON response to the HTTP GET request for a URL. The link microservice obtains this JSON data by reading the Kubernetes configMap "links-config," which is updated by the install operator during deployment of each web application.

It is to be appreciated that this particular example data shows just one example of a JSON response of link service, and alternative data and/or implementations can be used in other embodiments.

FIG. 5 shows an example code snippet for a common header JS in an illustrative embodiment. In this embodiment, example code snippet 500 is executed by a web browser. For example, the example code snippet 500 (which is included in each UI application via a script tag such as shown, for example, in connection with FIG. 3) may be viewed as comprising a portion of a software implementation of at least part of UI application 110 of the FIG. 1 embodiment.

The example code snippet 500 illustrates an example of a common JS file. It is to be appreciated that the JS, once loaded in the user browser, can invoke the REST API of a link microservice (e.g., via an asynchronous JavaScript and XML (AJAX) call). Once data in JSON format is received in the response to the REST API call, the JS can programmatically locate the placeholder HTML element (e.g., <DIV id="common-nav-header"/>) by traversing the DOM which is the in-memory model of the page. Once the placeholder HTML element is located, the JS programmatically replaces the HTML attribute of the element with a new HTML snippet which represents the common navigation header. The new HTML snippet may apply, for example, cascading style sheets (CS S) attributes to render the look and feel of the new content compatible and/or matching with rest of the page.

It is to be appreciated that this particular example code snippet shows just one example implementation of a common header JS, and alternative implementations of the process can be used in other embodiments.

As noted above, the JSON response shown in FIG. 4, for example, may include several attributes for a link to help "unified-ui-common-header.js" programmatically create a decorated and meaningful navigation header with hyperlinks to each registered web application. Also, because each registered web application includes the same JS "unified-ui-common-header.js" and HTML placeholder (e.g., <DIV id="common-nav-header"/>) in their page header, all such registered web applications automatically render the same common navigation header which includes hyperlinks to each registered web application. Additionally, because of SSO, the user, once authenticated, is not prompted for a login while navigating across these hyperlinks. Therefore, from a user's perspective, it feels like she/he is interacting with a single web application.

In Kubernetes, there is typically a REST API to manage the desired state of each resource. For example, deployment, ReplicaSet, ingress, service, configMap, secret, etc., are well-defined resources in Kubernetes. The kubectl or Helm can invoke a Kubernetes REST API in a declarative format to create, update and/or delete such resources. The resource definition in a manifest file is a declarative way to define the desired state of something. Kubernetes not only creates the resource as per a declaration, but also promises to monitor and maintain the desired state. For example, the deployment resource ensures that the pod is instantiated and responding. The moment that Kubernetes detects that the pod is not responding, Kubernetes will delete the pod and recreate a new one. If the node on which a pod was scheduled fails, then Kubernetes will recreate the pod on another healthy node.

In addition to standard resources, the Kubernetes has a concept of an operator and/or controller which is an automation code that an engineer can develop and deploy by using a Kubernetes operator software development kit (SDK) and extending the Kubernetes APIs via a CRD. For example, the ingress controller, cert-manager, load balancer, etc., can follow the same programming model to expand the Kubernetes ecosystem by adding custom resources and controller automation.

In accordance with at least one embodiment, the install operator implements a control loop to watch for lifecycle events and filter the events of the objects of interest. Once an install operator detects that an object of interest is being created, the install operator can take a range of actions to meet a prerequisite of the object (e.g., the desired state) before the object is fully created. Similarly, upon deletion of the object of interest, the install operator can clean the environment or release resources held by the object. As also detailed herein, in one or more embodiments, an install operator is built on a programming model and its automation steps are further described below.

FIG. 6 shows an example code snippet for a CRD for a unified application in an illustrative embodiment. In this embodiment, example code snippet 600 is executed by or under the control of at least one processing system and/or device. For example, the example code snippet 600 may be viewed as comprising a portion of a software implementation to extend a Kubernetes API.

The example code snippet 600 illustrates defining a custom resource that is added to the Kubernetes PaaS (e.g., using $kubectl apply unifiedapps-crd.yaml). It is to be appreciated that this particular example code snippet shows just one example implementation of a CRD for a unified application, and alternative implementations of the process can be used in other embodiments.

As also detailed herein, one or more embodiments include packaging an install operator binary in a cloud native format (e.g., container and Helm chart) and deploying it to a Kubernetes PaaS.

FIG. 7 shows an example code snippet for a custom resource object definition in an illustrative embodiment. In this embodiment, example code snippet 700 is executed by or under the control of at least one processing system and/or device. For example, the example code snippet 700 may be viewed as comprising a portion of a software deployment of at least part of UI application 110 of the FIG. 1 embodiment.

The example code snippet 700 illustrates an example of wherein a web application provides a manifest file to instantiate the custom resource "UnifiedApp." It is to be appreciated that this particular example code snippet shows just one example deployment of a custom resource object definition, and alternative implementations of the process can be used in other embodiments.

Additionally, in one or more embodiments, the web application is packaged in a cloud native format (e.g., container and Helm chart) and pushed to a Helm chart repository and container registry when a user/customer chooses to add the application from a catalog of applications. Also, in such an embodiment, the install operator is configured to monitor changes to the Helm chart repository, and when the install operator detects a new application or a new version of an existing application in the repository, the install operator starts the deployment of the chart by using one or more Helm libraries.

Further, in such an embodiment, the deployment of a web application with a UnifiedApp CRD manifest causes the control loop of the install operator to detect the creation of the UnifiedApp. As a result, the install operator automates one or more operations. For example, the install operator can automatically create an ingress object for the web application based on values of CRD parameters (e.g., serviceName, servicePort, linkURL, etc.). In such an embodiment, the install operator manages the ingress object for each web application so that the install operator can mount web applications to the primary domain because the unified UI service resources (e.g., unified-ui-common-header.js and link microservice API) are available from the primary domain and each web application included such resources in their code using a relative URL. As used herein, a relative URL is considered to be relative to the current domain of a loaded page (e.g., the URL bar of the browser). The browser automatically prefixes the current domain to a relative URL to make it an absolute URL before requesting the URL content from the web server.

Additionally, in one or more embodiments, because the primary domain name is not known until deployment at a user/customer site and could be different for each user/customer, the web applications cannot hardcode the domain name in their pages while referring to "unified-ui-common-header.js." The relative URL provides flexibility to the install operator to mount each web application under the primary domain defined by the user/customer during PaaS setup. Also, in at least one embodiment, the "unified-ui-common-header.js" code makes an AJAX call to a link microservice API using a relative URL (as shown in FIG. 5, for example) because this JS also does not know at the development time what the user/customer would choose for the domain name.

The install operator can also maintain, for example, a Kubernetes configMap object named "links-config" with an array of links. In such an embodiment, the install operator augments the links.json file (as shown in FIG. 4, for example) by adding values of CRD parameters (e.g., linkCategory, linkTitle, linkDescription, linkIcon and linkURL), and then calls a Kubernetes API to update the "links-config" as follows: kubectl creates configMap links-config from-file=links.json. This is an example mechanism for passing links from an install operator to the link microservice.

In one or more embodiments, an install operator can also be configured with administrator credentials of IDP to allow the install operator to register a web application with IDP based at least in part on values of one or more CRD parameters (e.g., ssoClientID and ssoRedirectURI). As a result of the registration, the IDP returns a client secret which the install operator copies to the Kubernetes secret store by creating a secret object under agreed upon keys (e.g., "ssoClientSecret" and "ssoWellKnownURL").

Figure 8:
FIG. 8 shows an example code snippet for a web application pod manifest in an illustrative embodiment.

FIG. 8 shows an example code snippet for a web application pod manifest in an illustrative embodiment. In this embodiment, example code snippet 800 is executed by or under the control of at least one processing system and/or device. For example, the example code snippet 800 may be viewed as comprising a portion of a software deployment of at least part of UI application 110 of the FIG. 1 embodiment.

The example code snippet 800 illustrates a web application pod manifest which includes reference to a secret store by specific key as the value of CRD parameter ssoClientID and agreed upon keys ssoClientSecret and ssoWellKnownURL. This is a way to pass the IDP information from the install operator to each web application. It is to be appreciated that this particular example code snippet shows just one example implementation of a web application pod manifest, and alternative implementations of the process can be used in other embodiments.

In one or more embodiments, a given web application already implements OIDC protocol which, based on the well-known URL, can discovers the rest of the metadata directly from the IDP and participate in SSO flows.

Figure 9:
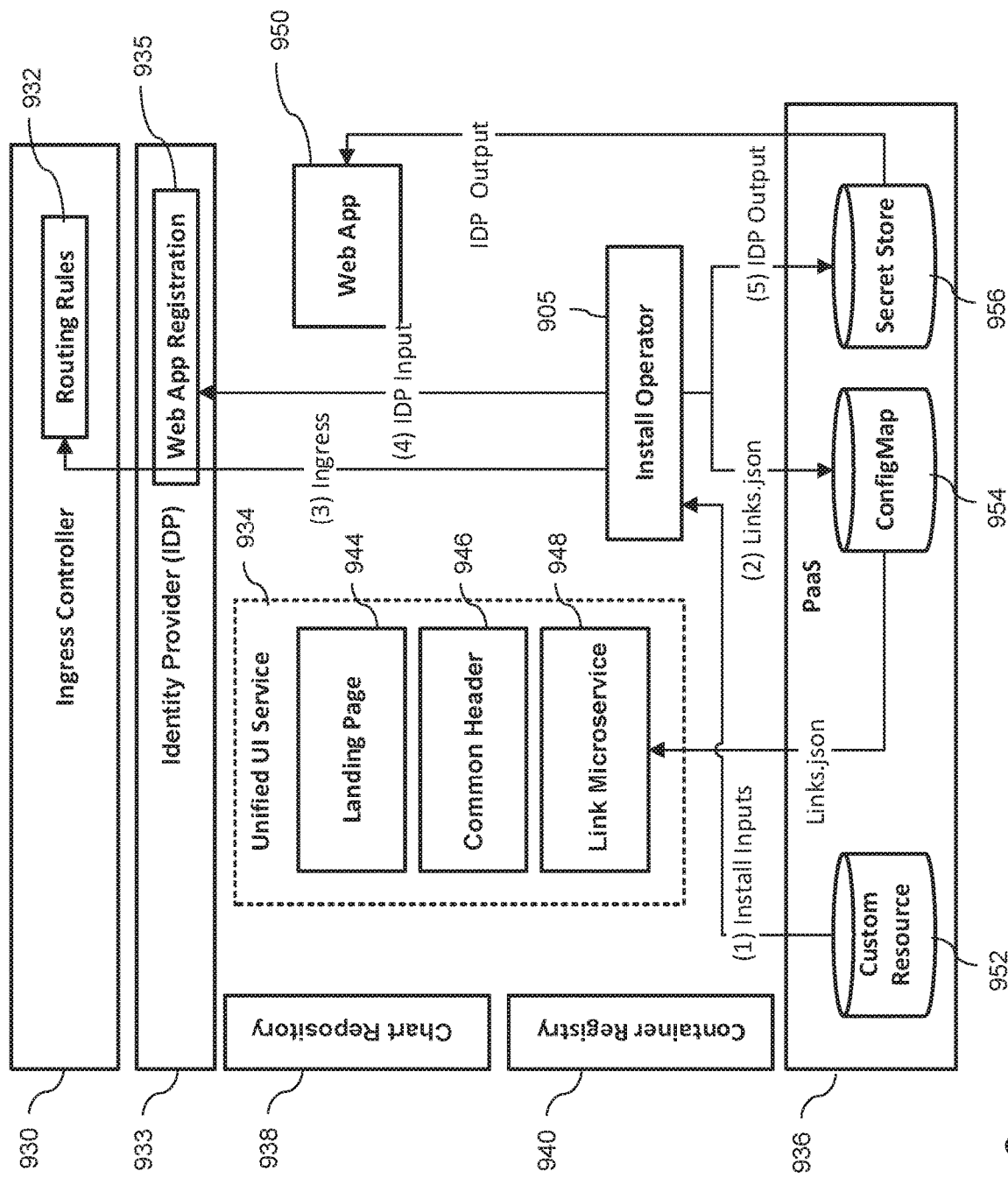
FIG. 9 shows a deployment flow interaction diagram in an illustrative embodiment.
Figure 10:
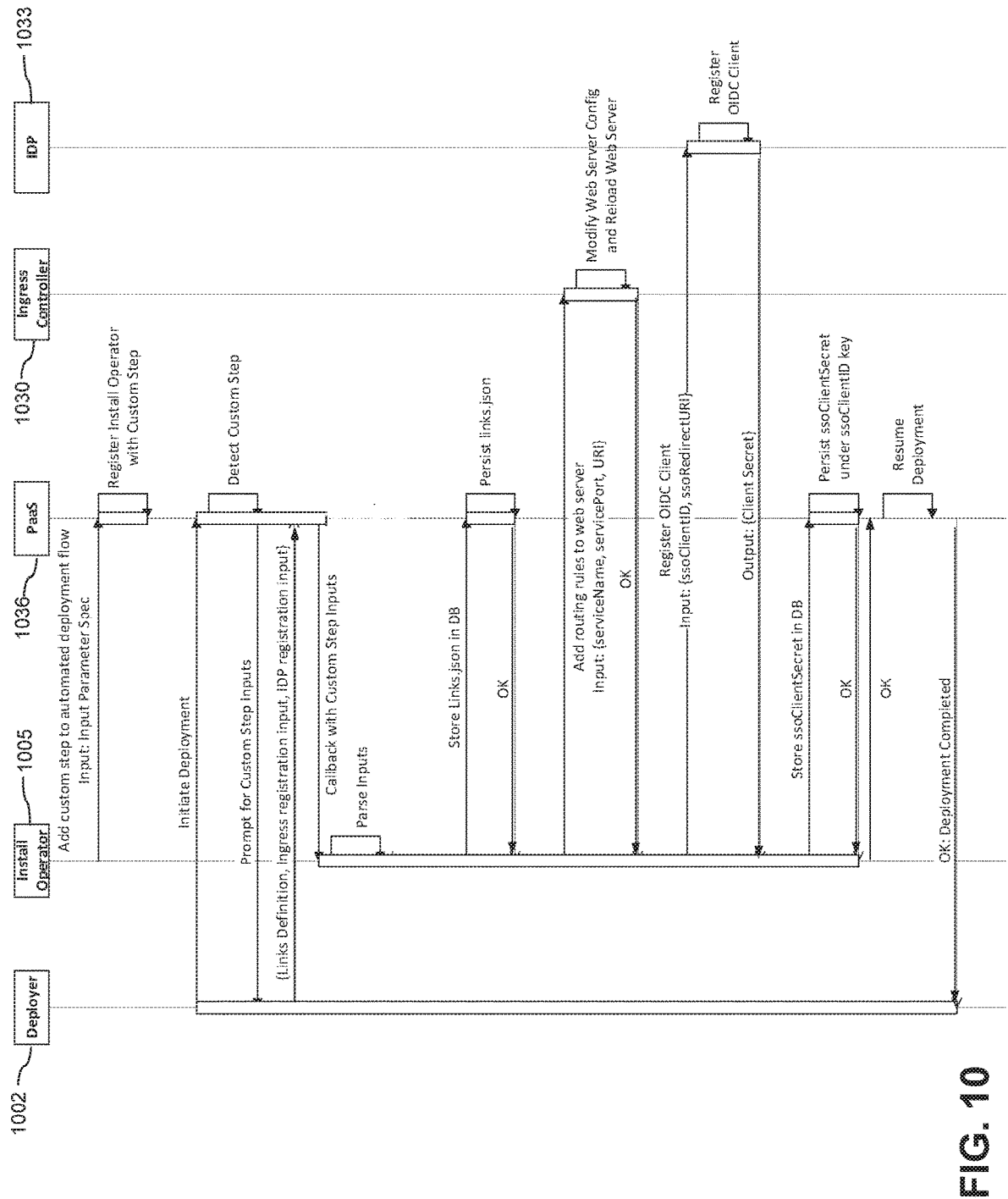
FIG. 10 shows a Platform-as-a-Service-specific (PaaS-specific) deployment flow with a custom step in an illustrative embodiment.

Accordingly, and as detailed herein, at least one embodiment includes operating in connection with a generic PaaS, assuming the PaaS provides an automated deployment workflow with an ability to inject at least one custom step. Additionally, and by way merely of example, FIG. 9 and FIG. 10 show components and a sequence of steps in an automated deployment flow wherein an install operator completes one or more tasks by intercepting the deployment flow. The install operator uses PaaS as a middleman to store and share output of its operations with the application being deployed. The deployed application, at startup, would need output of one or more operations completed by the install operator.

FIG. 9 shows a deployment flow interaction diagram in an illustrative embodiment. By way of illustration, FIG. 9 depicts ingress controller 930 (which includes routing rules 932), IDP component 933 (which includes web application registration component 935), chart repository 938 (e.g., Helm chart repository), container registry 940, unified UI service 934 (which includes landing page 944, common header 946, and link microservice 948), PaaS 936 (which includes custom resource database 952, configMap 954, and secret store 956), install operator 905 and web application 950.

In addition to descriptions of one or more of these components detailed herein in connection with at least one embodiment, FIG. 9 depicts a workflow sequence carried out among a portion of the components. Specifically, as illustrated in FIG. 9, step (1) includes install inputs being provided from custom resource database 952 to install operator 905. Step (2) includes install operator 905 providing input (e.g., links.json) to configMap 954 (which provides at least a portion of such input to link microservice 948), and step (3) includes install operator 905 providing ingress information to the routing rules component 932 within ingress controller 930. Additionally, step (4) includes install operator 905 providing IDP input to the web application registration component 935 within IDP component 933. Further, as depicted in FIG. 9, step (5) includes install operator 905 providing IDP output to secret store 956 (which provides at least a portion of such IDP output to web application 950).

FIG. 10 shows a PaaS-specific deployment flow with a custom step in an illustrative embodiment. Specifically, FIG. 10 depicts a sequence of steps across deployer 1002, install operator 1005, PaaS 1036, ingress controller 1030, and IDP 1033. As illustrated in FIG. 10, install operator 1005 adds a custom step to automate a deployment flow and provides input (e.g., input parameter specification) to PaaS 1036. PaaS 1036 then registers install operator 1005 with the custom step. As also illustrated in FIG. 10, deployer 1002 initiates the deployment with PaaS 1036, and PaaS 1036 detects the added custom step and prompts deployer 1002 for custom step inputs. In response, deployment 1002 provides, to PaaS 1036, links definition(s), ingress registration input, and IDP registration input. Additionally, PaaS 1036 provides a callback to install operator 1005 with the custom step inputs, install operator 1005 parses the provided inputs.

Also, install operator 1005 stores links.json information in a database (DB) of PaaS 1036, PaaS 1036 persists the provided links.json information and sends install operator 1005 a response indicating acceptance of the information. Install operator 1005 then adds one or more routing rules to a web server and provides inputs to ingress controller 1030 that include service name, service port, uniform resource identifier (URI), etc. Ingress controller 1030, using at least a portion of these provided inputs, modifies the web server configuration and reloads the web server, then sends a response to install operator 1005 indicating acceptance of the inputs and/or a successful reload of the web server. Further, install operator 1005 registers an OIDC client and provides input to IDP 1033 that includes ssoClientID, ssoRedirectURI, etc. IDP 1033 then registers the OIDC client and outputs to install operator 1005 a client secret.

Install operator 1005 then instructs PaaS 1036 to store the client secret in a database, PaaS 1036 persists the client secret under a ssoClientID key, and sends a response to install operator 1005 indicating success of the client secret storage. Install operator 1005 then sends PaaS 1036 a response indicating acceptance of the inputs (thereby noting to PaaS 1036 all intermediate automation steps performed by install operator 1005 are completed). PaaS 1036 then resumes the deployment and subsequently provides an indication to deployer 1002 that the deployment has been completed.

Figure 11:
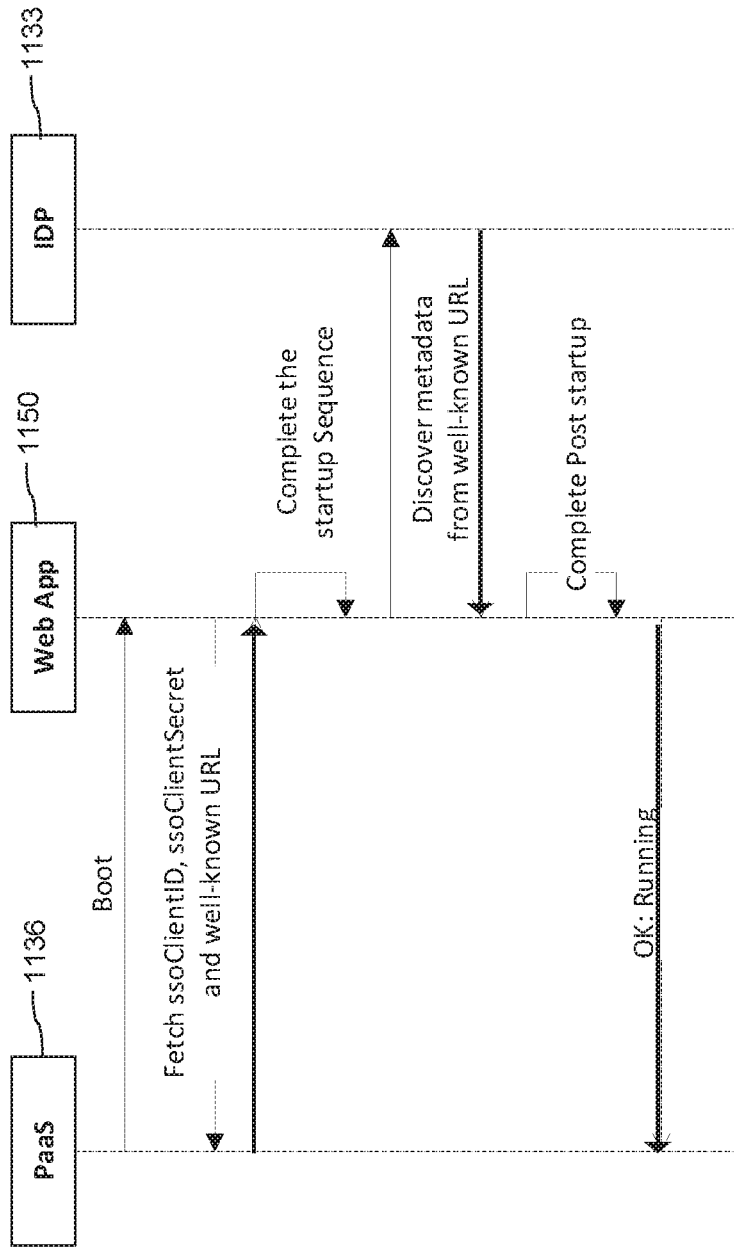
FIG. 11 shows a web application startup sequence in an illustrative embodiment.

FIG. 11 shows a web application startup sequence in an illustrative embodiment. Specifically, FIG. 11 depicts a sequence of steps across PaaS 1136, web application 1150, and IDP 1133. As illustrated in FIG. 11, PaaS 1136 provides boot instructions to web application 1150, and web application 1150 responds by fetching information (e.g., ssoClientID, ssoClientSecret, and a well-known URL) from PaaS 1136. PaaS 1136 provides the requested information to web application 1150, which completes a startup sequence and carries out an exchange with IDP 1133 to discover metadata from the well-known URL. Subsequently, web application 1150 completes a post-startup task and provides an indication to PaaS 1136 that the web application is running.

Figure 12:
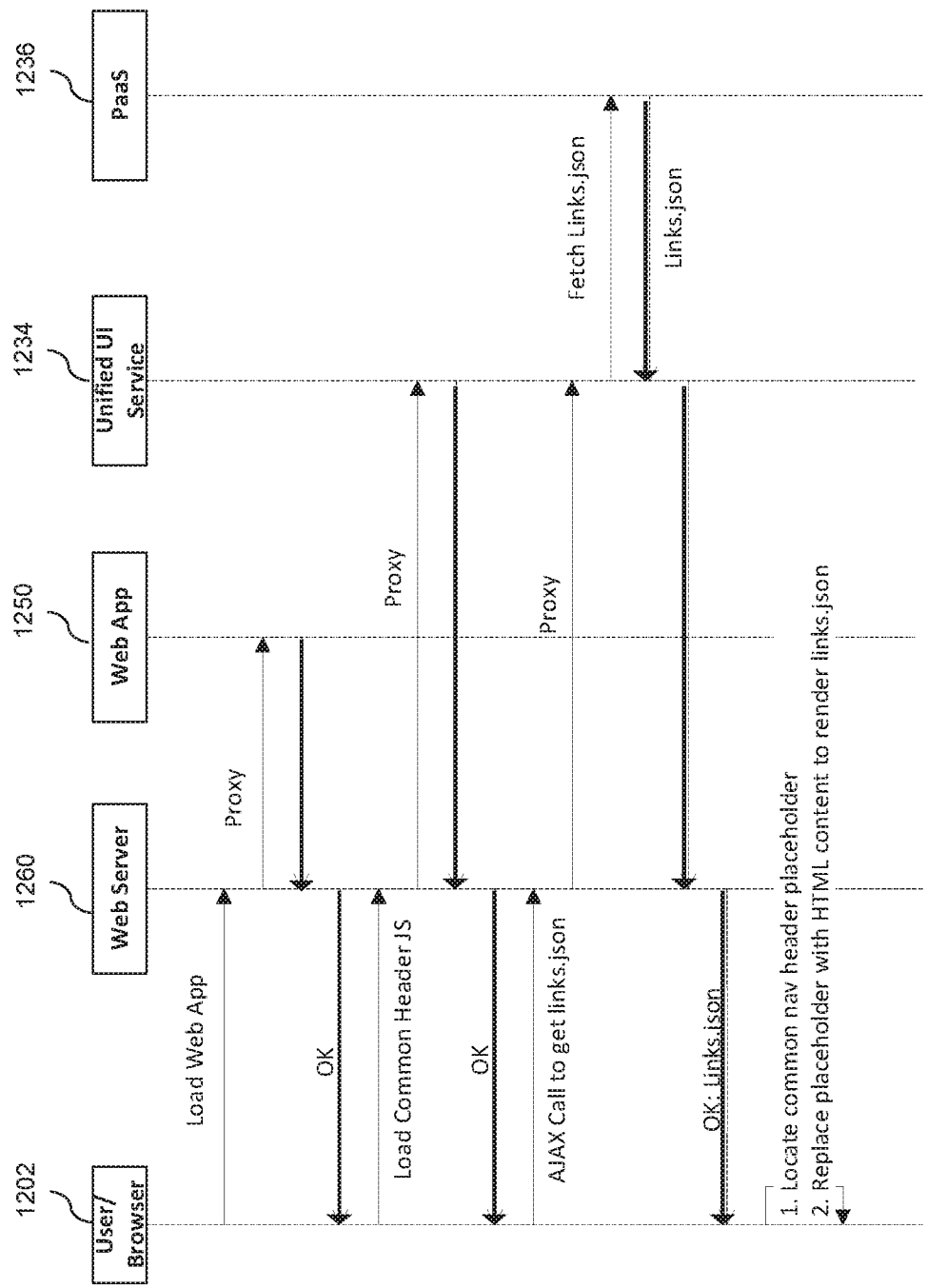
FIG. 12 shows a sequence diagram for rendering a common navigational header in an illustrative embodiment.

FIG. 12 shows a sequence diagram for rendering a common navigational header in an illustrative embodiment. Specifically, FIG. 12 depicts a sequence of steps across user/browser 1202, web server 1260, web application 1250, unified UI service 1234, and PaaS 1236. As illustrated in FIG. 12, user/browser 1202 provides an instruction to load web application 1250 via web server 1260, which serves as a proxy for web application 1250. Web application 1250, in response, provides an indication to user/browser 1202, via web server 1260, that the instruction has been accepted and/or the web application is loading/loaded. Subsequently, user/browser 1202 loads a common header JS with unified UI service 1234 via web server 1260, which serves as a proxy, and unified UI service 1234 provides an indication to user/browser 1202, via web server 1260, that the common header JS has been loaded.

As also depicted in FIG. 12, user/browser 1202 submits an AJAX call, via web server 1260 (which serves as a proxy), to unified UI service 1234 to obtain links.json information. Unified UI service 1234 then fetches the requested links.json information from PaaS 1236 and provides an indication to user/browser 1202 (via web server 1260) that the links.json information has been obtained and provides the information to user/browser 1202. Further, user/browser 1202 then locates a common navigational (nav) header placeholder and replaces the placeholder with HTML content to render the links.json information.

Figure 13:
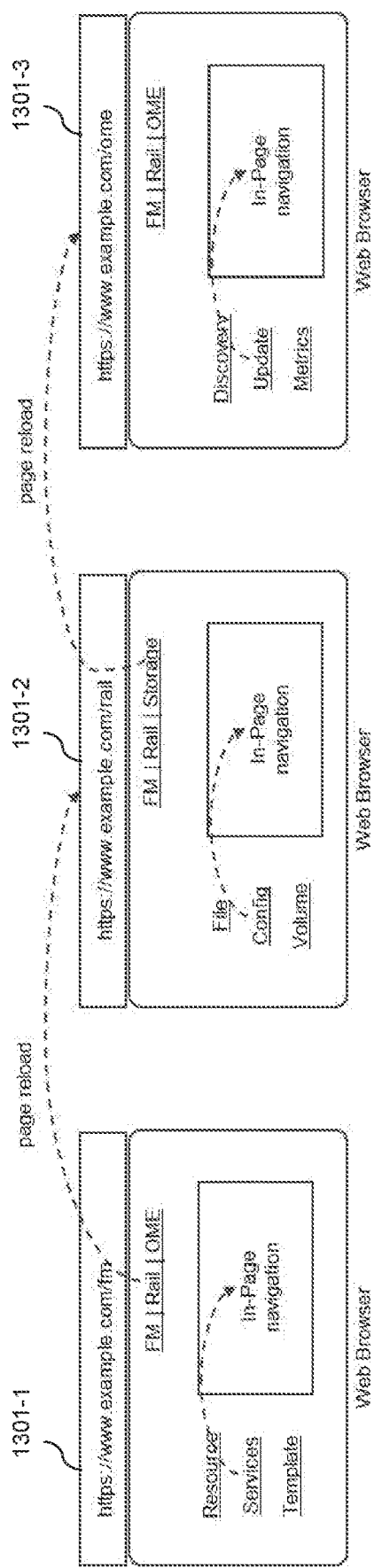
FIG. 13 shows an example of a unified user experience using a common navigational header in an illustrative embodiment.

FIG. 13 shows an example of a unified user experience using a common navigational header in an illustrative embodiment. Specifically, FIG. 13 depicts how a user might leverage the common navigation header to visit different web applications 1301-1, 1301-2, and 1301-3 in connection with multiple page reloads.

Figure 14:
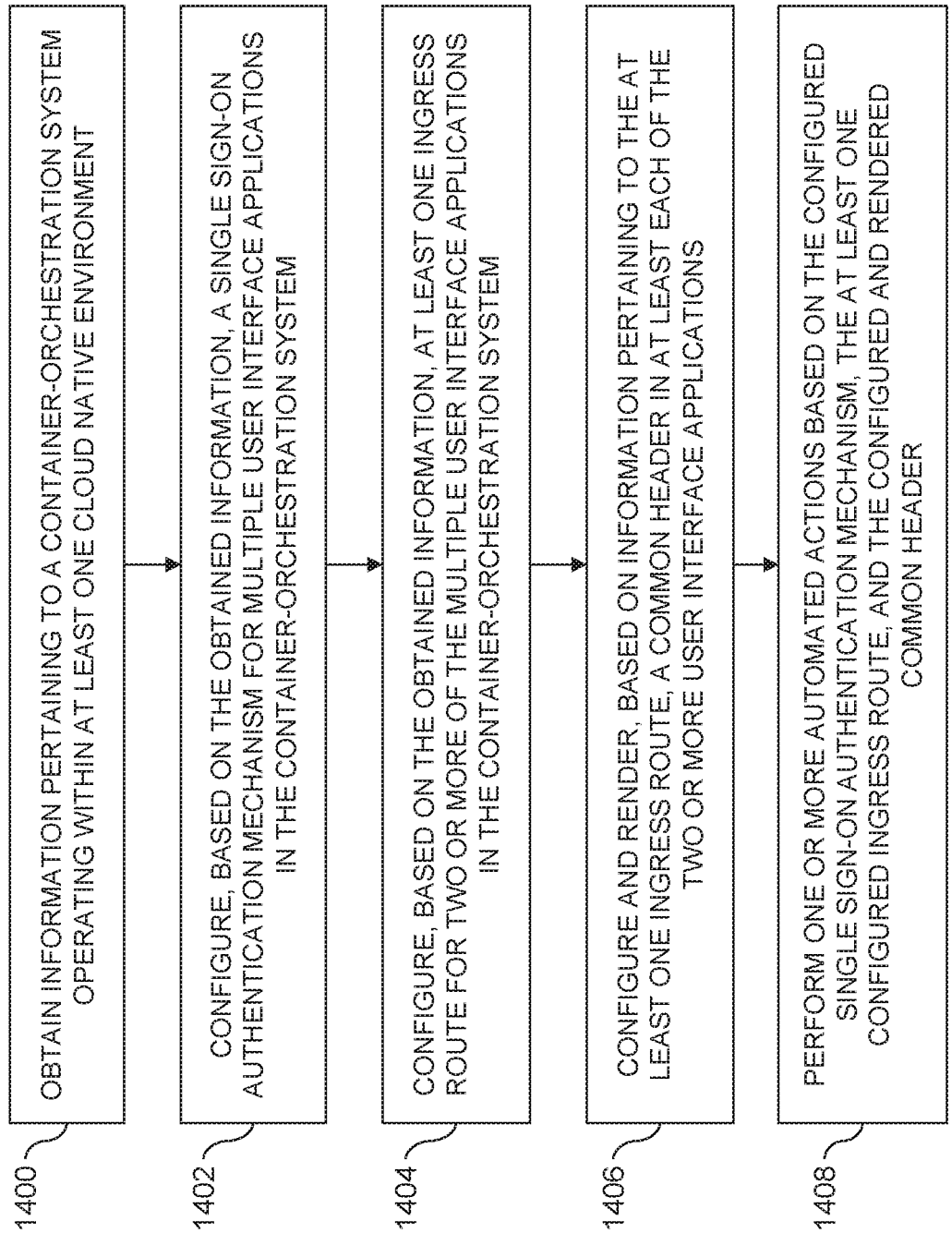
FIG. 14 is a flow diagram of a process for dynamically unifying disparate UI applications in a cloud native environment in an illustrative embodiment.

FIG. 14 is a flow diagram of a process for dynamically unifying disparate UI applications in a cloud native environment in an illustrative embodiment. It is to be understood that this particular process is only an example, and additional or alternative processes can be carried out in other embodiments.

In this embodiment, the process includes steps 1400 through 1408. These steps are assumed to be performed by the UI application unification install operator 105 utilizing its modules 112, 114 and 116.

Step 1400 includes obtaining information pertaining to a container-orchestration system operating within at least one cloud native environment. In one or more embodiments, obtaining the information pertaining to the container-orchestration system includes processing at least one notification from the container-orchestration system when a custom resource definition is at least one of created, updated, and deleted.

Step 1402 includes configuring, based at least in part on the obtained information, a single sign-on authentication mechanism for multiple user interface applications in the container-orchestration system. In at least one embodiment, configuring the single sign-on authentication mechanism includes determining one or more single sign-on authentication mechanism parameters by parsing at least a portion of the obtained information pertaining to the container-orchestration system.

Step 1404 includes configuring, based at least in part on the obtained information, at least one ingress route for two or more of the multiple user interface applications in the container-orchestration system.

Step 1406 includes configuring and rendering, based at least in part on information pertaining to the at least one ingress route, a common header in at least each of the two or more user interface applications. In at least one embodiment, configuring the common header includes configuring one or more navigation uniform resource locators for the common header. Additionally or alternatively, in one or more embodiments, configuring the common header includes reading metadata pertaining to the at least one ingress route from at least one container-orchestration system configuration map and returning a navigation map at page load time to a portion of programming language included in at least each of the two or more user interface applications. Also, such an embodiment can include replacing a hypertext markup language placeholder in at least each of the two or more user interface applications with at least the portion of programming language.

Step 1408 includes performing one or more automated actions based at least in part on the configured single sign-on authentication mechanism, the at least one configured ingress route, and the configured and rendered common header. In at least one embodiment, performing the one or more automated actions includes transforming at least the two or more user interface applications into a unified user interface framework. Additionally or alternatively, in one or more embodiments, performing the one or more automated actions includes implementing a single-page application as a front-end user interface application, and generating, using the single-page application, at least one navigation of routes across at least the two or more user interface applications.

Accordingly, the particular processing operations and other functionality described in conjunction with the flow diagram of FIG. 14 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments include configuring a single sign-on authentication mechanism, ingress routes, and a common header to unify multiple UI applications within a container-orchestration system. These and other embodiments can effectively overcome problems associated with UI application integration and user experience.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 15 and 16. Although described in the context of system 100, these platforms may also be used to implement at least portions of other information processing systems in other embodiments.

Figure 15:
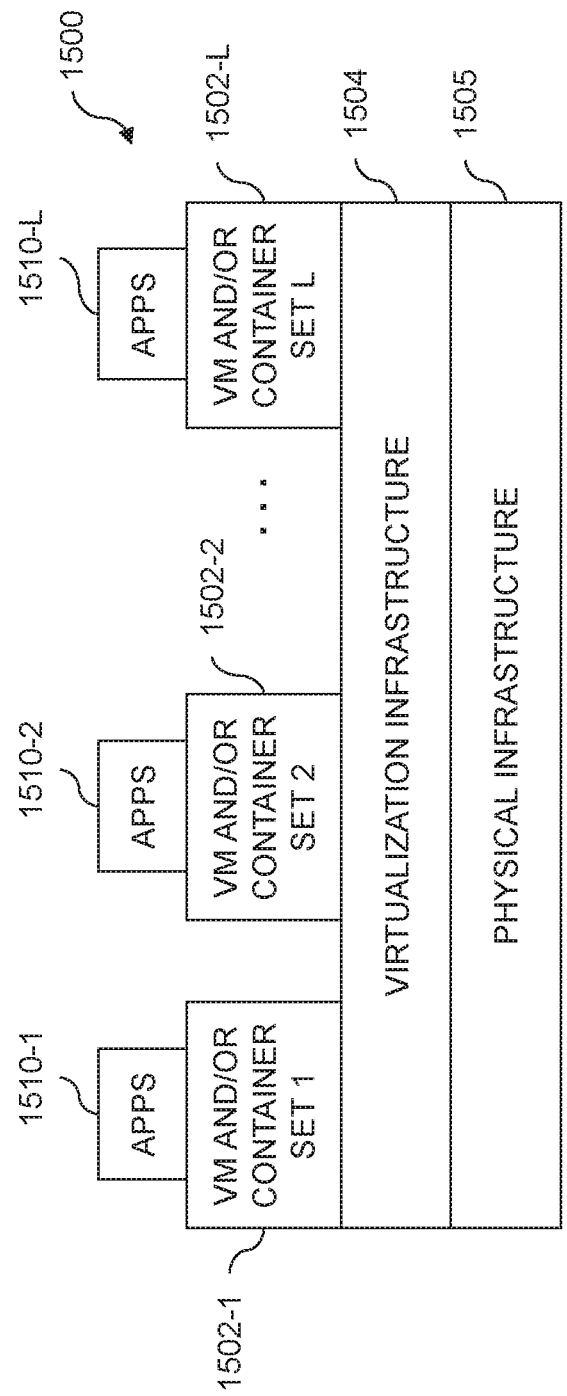
FIGS. 15 and 16 show examples of processing platforms that may be utilized to implement at least a portion of an information processing system in illustrative embodiments.

FIG. 15 shows an example processing platform comprising cloud infrastructure 1500. The cloud infrastructure 1500 comprises a combination of physical and virtual processing resources that are utilized to implement at least a portion of the information processing system 100. The cloud infrastructure 1500 comprises multiple VMs and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 comprise respective VMs, respective sets of one or more containers, or respective sets of one or more containers running in VMs. In some implementations of the FIG. 15 embodiment, the VMs/container sets 1502 comprise respective VMs implemented using virtualization infrastructure 1504 that comprises at least one hypervisor.

A hypervisor platform may be used to implement a hypervisor within the virtualization infrastructure 1504, wherein the hypervisor platform has an associated virtual infrastructure management system. The underlying physical machines comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

Figure 16:
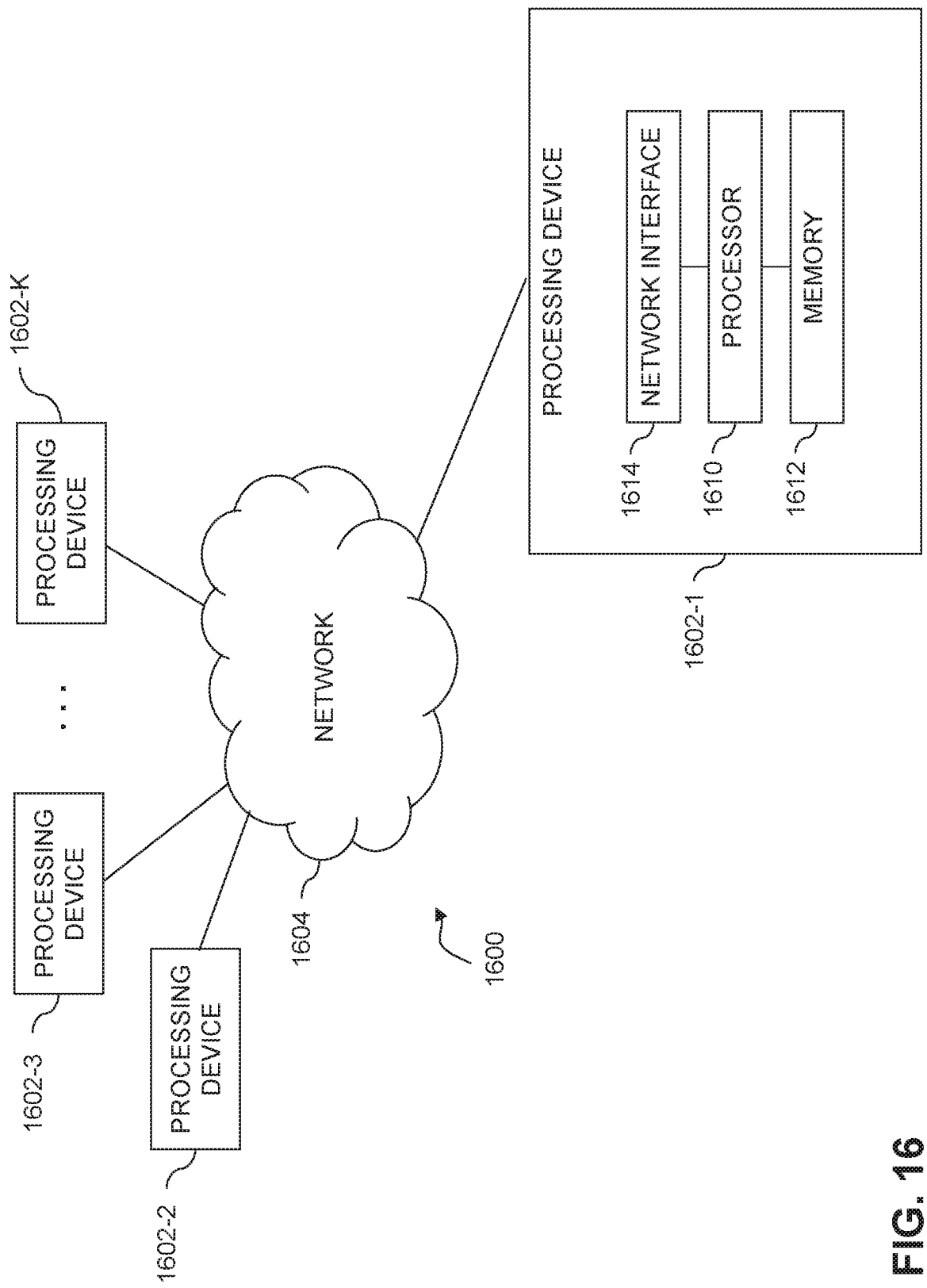

As is apparent from the above, one or more of the processing modules or other components of system 100 may each run on a computer, server, storage device or other processing platform element. A given such element is viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1602-1 in the processing platform 1600 comprises a processor 1610 coupled to a memory 1612.

The processor 1610 comprises a microprocessor, a microcontroller, an application-specific integrated circuit (ASIC), a field-programmable gate array (FPGA) or other type of processing circuitry, as well as portions or combinations of such circuitry elements.

The memory 1612 comprises random access memory (RAM), read-only memory (ROM) or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, devices, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining information pertaining to a container-orchestration system operating within at least one cloud native environment;
    configuring, based at least in part on the obtained information, a single sign-on authentication mechanism for multiple user interface applications in the container-orchestration system;
    configuring, based at least in part on the obtained information, at least one ingress route for two or more of the multiple user interface applications in the container-orchestration system, wherein configuring at least one ingress route comprises automatically defining one or more reverse proxy rules and one or more transport layer security techniques for encrypting traffic for the at least one ingress route in the container-orchestration system;
    configuring and rendering, based at least in part on information pertaining to the at least one ingress route, a common header in each of the two or more user interface applications, wherein configuring the common header is based at least in part on metadata pertaining to the at least one ingress route derived from at least one container-orchestration system configuration map, and wherein configuring the common header comprises reading at least a portion of the metadata pertaining to the at least one ingress route derived from the at least one container-orchestration system configuration map; returning a navigation map, at page load time, to one or more code segments in a programming language, the one or more code segments included in each of the two or more user interface applications; and replacing at least one hypertext markup language placeholder in the one or more code segments; and
    performing one or more automated actions based at least in part on the configured single sign-on authentication mechanism, the at least one configured ingress route, and the configured and rendered common header;
    wherein the method is performed by at least one processing device comprising a processor coupled to a memory.

2. The computer-implemented method of claim 1, wherein performing the one or more automated actions comprises transforming at least the two or more user interface applications into a unified user interface framework.

3. The computer-implemented method of claim 1, wherein configuring the single sign-on authentication mechanism comprises determining one or more single sign-on authentication mechanism parameters by parsing at least a portion of the obtained information pertaining to the container-orchestration system.

4. The computer-implemented method of claim 1, wherein configuring the common header comprises configuring one or more navigation uniform resource locators for the common header.

5. The computer-implemented method of claim 1, wherein obtaining the information pertaining to the container-orchestration system comprises processing at least one notification from the container-orchestration system when a custom resource definition is at least one of created, updated, and deleted.

6. The computer-implemented method of claim 1, wherein performing the one or more automated actions comprises implementing a single-page application as a front-end user interface application, and generating, using the single-page application, at least one navigation of routes across at least the two or more user interface applications.

7. A non-transitory processor-readable storage medium having stored therein program code of one or more software programs, wherein the program code when executed by at least one processing device causes the at least one processing device:
    to obtain information pertaining to a container-orchestration system operating within at least one cloud native environment;
    to configure, based at least in part on the obtained information, a single sign-on authentication mechanism for multiple user interface applications in the container-orchestration system;
    to configure, based at least in part on the obtained information, at least one ingress route for two or more of the multiple user interface applications in the container-orchestration system, wherein configuring at least one ingress route comprises automatically defining one or more reverse proxy rules and one or more transport layer security techniques for encrypting traffic for the at least one ingress route in the container-orchestration system;
    to configure and render, based at least in part on information pertaining to the at least one ingress route, a common header in each of the two or more user interface applications, wherein configuring the common header is based at least in part on metadata pertaining to the at least one ingress route derived from at least one container-orchestration system configuration map, and wherein configuring the common header comprises reading at least a portion of the metadata pertaining to the at least one ingress route derived from the at least one container-orchestration system configuration map; returning a navigation map, at page load time, to one or more code segments in a programming language, the one or more code segments included in each of the two or more user interface applications; and replacing at least one hypertext markup language placeholder in the one or more code segments; and
    to perform one or more automated actions based at least in part on the configured single sign-on authentication mechanism, the at least one configured ingress route, and the configured and rendered common header.

8. The non-transitory processor-readable storage medium of claim 7, wherein performing the one or more automated actions comprises transforming at least the two or more user interface applications into a unified user interface framework.

9. The non-transitory processor-readable storage medium of claim 7, wherein configuring the single sign-on authentication mechanism comprises determining one or more single sign-on authentication mechanism parameters by parsing at least a portion of the obtained information pertaining to the container-orchestration system.

10. The non-transitory processor-readable storage medium of claim 7, wherein configuring the common header comprises configuring one or more navigation uniform resource locators for the common header.

11. The non-transitory processor-readable storage medium of claim 7, wherein performing the one or more automated actions comprises implementing a single-page application as a front-end user interface application, and generating, using the single-page application, at least one navigation of routes across at least the two or more user interface applications.

12. The non-transitory processor-readable storage medium of claim 7, wherein obtaining the information pertaining to the container-orchestration system comprises processing at least one notification from the container-orchestration system when a custom resource definition is created.

13. The non-transitory processor-readable storage medium of claim 7, wherein obtaining the information pertaining to the container-orchestration system comprises processing at least one notification from the container-orchestration system when a custom resource definition is updated.

14. The non-transitory processor-readable storage medium of claim 7, wherein obtaining the information pertaining to the container-orchestration system comprises processing at least one notification from the container-orchestration system when a custom resource definition is deleted.

15. An apparatus comprising:
at least one processing device comprising a processor coupled to a memory;
the at least one processing device being configured:
to obtain information pertaining to a container-orchestration system operating within at least one cloud native environment;
to configure, based at least in part on the obtained information, a single sign-on authentication mechanism for multiple user interface applications in the container-orchestration system;
to configure, based at least in part on the obtained information, at least one ingress route for two or more of the multiple user interface applications in the container-orchestration system, wherein configuring at least one ingress route comprises automatically defining one or more reverse proxy rules and one or more transport layer security techniques for encrypting traffic for the at least one ingress route in the container-orchestration system;
to configure and render, based at least in part on information pertaining to the at least one ingress route, a common header in each of the two or more user interface applications, wherein configuring the common header is based at least in part on metadata pertaining to the at least one ingress route derived from at least one container-orchestration system configuration map, and wherein configuring the common header comprises reading at least a portion of the metadata pertaining to the at least one ingress route derived from the at least one container-orchestration system configuration map; returning a navigation map, at page load time, to one or more code segments in a programming language, the one or more code segments included in each of the two or more user interface applications; and replacing at least one hypertext markup language placeholder in the one or more code segments; and
to perform one or more automated actions based at least in part on the configured single sign-on authentication mechanism, the at least one configured ingress route, and the configured and rendered common header.

16. The apparatus of claim 15, wherein performing the one or more automated actions comprises transforming at least the two or more user interface applications into a unified user interface framework.

17. The apparatus of claim 15, wherein configuring the single sign-on authentication mechanism comprises determining one or more single sign-on authentication mechanism parameters by parsing at least a portion of the obtained information pertaining to the container-orchestration system.

18. The apparatus of claim 15, wherein configuring the common header comprises configuring one or more navigation uniform resource locators for the common header.

19. The apparatus of claim 15, wherein obtaining the information pertaining to the container-orchestration system comprises processing at least one notification from the container-orchestration system when a custom resource definition is at least one of created, updated, and deleted.

20. The apparatus of claim 15, wherein performing the one or more automated actions comprises implementing a single-page application as a front-end user interface application, and generating, using the single-page application, at least one navigation of routes across at least the two or more user interface applications.

* * * * *